United States Patent
Kan

(10) Patent No.: US 9,577,262 B2
(45) Date of Patent: Feb. 21, 2017

(54) POSITIVE ELECTRODE MATERIAL FOR LITHIUM ION SECONDARY CELL AND LITHIUM ION SECONDARY CELL

(75) Inventor: Takeshi Kan, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 66 days.

(21) Appl. No.: 14/238,747

(22) PCT Filed: Sep. 12, 2012

(86) PCT No.: PCT/JP2012/073291
§ 371 (c)(1),
(2), (4) Date: Feb. 13, 2014

(87) PCT Pub. No.: WO2013/042591
PCT Pub. Date: Mar. 28, 2013

(65) Prior Publication Data
US 2014/0154570 A1   Jun. 5, 2014

(30) Foreign Application Priority Data

Sep. 22, 2011  (JP) ................................. 2011-207524

(51) Int. Cl.
| | | |
|---|---|---|
| *H01M 10/0564* | (2010.01) | |
| *H01M 4/62* | (2006.01) | |
| *H01M 4/131* | (2010.01) | |
| *H01M 4/505* | (2010.01) | |
| *H01M 4/525* | (2010.01) | |
| *H01M 10/0525* | (2010.01) | |
| *H01M 4/1391* | (2010.01) | |

(52) U.S. Cl.
CPC ........... *H01M 4/621* (2013.01); *H01M 4/131* (2013.01); *H01M 4/505* (2013.01); *H01M 4/525* (2013.01); *H01M 4/62* (2013.01); *H01M 4/622* (2013.01); *H01M 4/625* (2013.01); *H01M 4/1391* (2013.01); *H01M 4/623* (2013.01); *H01M 10/0525* (2013.01); *Y02E 60/122* (2013.01)

(58) Field of Classification Search
CPC ........ H01M 4/621; H01M 4/62; H01M 4/622; H01M 4/625; H01M 4/505; H01M 4/131; H01M 4/525; H01M 4/1391; H01M 4/623; H01M 10/0525; Y02E 60/122
See application file for complete search history.

(56) References Cited

U.S. PATENT DOCUMENTS

| | | | |
|---|---|---|---|
| 5,707,756 A | 1/1998 | Inoue et al. | |
| 2002/0041995 A1* | 4/2002 | Bannai | ................... 429/213 |
| 2008/0003506 A1* | 1/2008 | Suzuki | ................... 429/314 |
| 2009/0274960 A1* | 11/2009 | Yokouchi | ................ 429/231.8 |
| 2011/0052991 A1 | 3/2011 | Kim et al. | |

FOREIGN PATENT DOCUMENTS

| | | |
|---|---|---|
| CN | 1348614 A | 5/2002 |
| CN | 101478036 A | 7/2009 |
| EP | 1294040 A2 | 3/2003 |
| EP | 1381097 A1 | 1/2004 |
| JP | 09-199132 A | 7/1997 |
| JP | 2001-283861 A | 10/2001 |
| JP | 2003-163006 A | 6/2003 |
| JP | 2005-123185 A | 5/2005 |
| JP | 2009-527091 A | 7/2009 |
| JP | 2011-519142 A | 6/2011 |
| JP | 2011-154997 A | 8/2011 |
| JP | 2011-210694 A | 10/2011 |
| JP | 2012-190569 A | 10/2012 |
| JP | 2013-030445 A | 2/2013 |
| WO | 2011025080 A1 | 3/2011 |
| WO | 2012/128274 A1 | 9/2012 |

OTHER PUBLICATIONS

Japanese Patent Office, International Search Report issued in Application No. PCT/JP2012/073291, mailed Nov. 6, 2012, 4 pp.
European Patent Office, Extended European Search Report issued in corresponding European Patent Application No. 12834333.2 dated Apr. 8, 2015.
Japanese Patent Office, Notice of Reasons for Rejection issued in corresponding Japanese Patent Application No. 2011-207524 and English-language translation, mailed Jun. 30, 2015.
Japanese Patent Office, Notice of Allowance issued in corresponding Japanese Patent Application No. 2011-207524 and English-language translation, mailed Sep. 15, 2015.
European Patent Office, Office Action issued in corresponding European Patent Application No. 12834333.2 dated Feb. 15, 2016.
State Intellectual Property Office of the People'S Republic of China, Second Notification of Office Action issued in corresponding Chinese Patent Application No. 201280034993.3 and English-languge translation issued Dec. 21, 2015.

* cited by examiner

*Primary Examiner* — Cynthia K Walls
(74) *Attorney, Agent, or Firm* — Wood Herron & Evans LLP

(57) ABSTRACT

A positive electrode material for a lithium ion secondary cell, includes: a binding agent in which an active material formed from a lithium metal oxide are dispersed together with barium titanate and conductive carbon.

13 Claims, No Drawings

POSITIVE ELECTRODE MATERIAL FOR LITHIUM ION SECONDARY CELL AND LITHIUM ION SECONDARY CELL

TECHNICAL FIELD

The present invention relates to a positive electrode material for a lithium ion secondary cell and a lithium ion secondary cell.

BACKGROUND ART

In recent years, lithium ion secondary cells have been used as a power supply cell of portable electronics such as cell phones and laptops.

In general, a positive electrode of a lithium ion secondary cell is obtained by forming a mixture layer by applying a slurry to a collector and drying the collector with the slurry, the slurry being produced by adding a positive electrode material in which a powdery active material is dispersed in a binding agent to a solvent.

Conventionally, a lithium metal oxide such as a lithium cobalt oxide ($LiCO_2$) has been used as an active material of a positive electrode (positive electrode active material). The lithium cobalt oxide is a material which can be expected to provide a high cell capacity, but has problems in that the cobalt in the lithium cobalt oxide is expensive and availability is poor.

Therefore, the application of a lithium-nickel-cobalt-manganese composite metal oxide has been recently considered as a positive electrode active material which can be expected to provide the same cell capacity as the lithium cobalt oxide.

In addition, a positive electrode material may contain a conductive assistant such as conductive carbon to sufficiently interchange electrons between a positive electrode active material and a collector by increasing electron conductivity of the electrode.

PATENT DOCUMENT 1 discloses a core-shell-type positive electrode active material formed of a core portion made from a lithium metal oxide and a shell portion which is formed by coating the core portion with a material containing barium titanate, a metal oxide, and a conductive assistant. According to PATENT DOCUMENT 1, by coating the lithium metal oxide with the barium titanate and the metal oxide, electric resistance is increased and thermal stability of the positive electrode active material is improved. Furthermore, since the shell portion forming material contains the conductive assistant, excellent electric discharge characteristics of the positive electrode active material can be maintained.

PRIOR ART DOCUMENTS

Patent Documents

[PATENT DOCUMENT 1] Published Japanese Translation No. 2011-519142 of the PCT International Publication

DISCLOSURE OF INVENTION

Problems to be Solved by Invention

Since portable electronics and the like have been downsized, lithium ion secondary cells also tend to be downsized. Therefore, a further improvement in the cell capacity per volume is required for the lithium ion secondary cells.

However, a sufficient increase in the cell capacity is not easily achieved just by containing a conductive assistant in a positive electrode material.

In addition, regarding the positive electrode active material described in PATENT DOCUMENT 1, a lithium metal oxide is coated with barium titanate and the like in a dry mechanical manner and then heat-treated, and thus higher skills is required. Furthermore, a high technology is required to coat the surface of the lithium metal oxide with other inorganic particles. In addition, a lithium ion secondary cell using this positive electrode active material does not sufficiently satisfy a high cell capacity.

The invention is contrived in view of the circumstances, and an object of the invention is to provide a positive electrode material for a lithium ion secondary cell, with which a lithium ion secondary cell having a high cell capacity per volume is obtained, and a lithium ion secondary cell.

Means for Solving the Problems

In order to increase a cell capacity, it is important to consider how to release lithium ions separated from a positive electrode active material from a positive electrode and move the lithium ions to a negative electrode during charging, and how to move the lithium ions from the negative electrode to the positive electrode during discharging. The inventors of the present invention have conducted an intensive study and as a result, found that the presence of a binding agent which supports a positive electrode active material and a conductive assistant by a collector disturbs the movement of lithium ions in a mixture layer, and thus the cell capacity is not easily improved. After a great deal of consideration, the inventors have found that when barium titanate having a high permittivity is used in combination with a conductive assistant, the ionic conductance of a positive electrode material increases, and thus lithium ions move smoothly in a mixture layer formed from the positive electrode material, and have completed the invention.

That is, in a positive electrode material for a lithium ion secondary cell of the invention, an active material formed from a lithium metal oxide is dispersed in a binding agent together with barium titanate and conductive carbon.

The lithium metal oxide is preferably a composite metal oxide expressed by the following Expression (1).

$$LiNi_xMn_yCo_zO_2 \qquad (1)$$

(in Expression (1), Li represents lithium, Ni represents nickel, Mn represents manganese, Co represents cobalt, O represents oxygen, and $0<x<1$, $0<y<1$, $0<z<1$, and $x+y+z=1$ are satisfied.)

The content of the barium titanate is preferably 3.3 to 66.7 parts by mass with respect to 100 parts by mass of the binding agent.

A lithium ion secondary cell of the invention has a positive electrode which is provided with a collector and a mixture layer formed on the collector using the positive electrode material for a lithium ion secondary cell.

Effects of the Invention

According to a positive electrode material for a lithium ion secondary cell of the invention, a lithium ion secondary cell having a high cell capacity per volume is obtained.

In addition, a lithium ion secondary cell of the invention has a high cell capacity per volume.

Embodiments for Carrying Out the Invention

Hereinafter, the invention will be described in detail.
[Positive Electrode Material for Lithium Ion Secondary Cell]

In a positive electrode material for a lithium ion secondary cell of the invention (hereinafter, the positive electrode material for a lithium ion secondary cell is simply referred to as "positive electrode material"), an active material (positive electrode active material) formed from a lithium metal oxide is dispersed in a binding agent together with barium titanate and conductive carbon.

In the invention, a "conductive" material means that the material has a volume resistivity of $10^8$ Ω·cm or less.
<Active Material>

The active material (positive electrode active material) is formed from a lithium metal oxide.

The lithium metal oxide is not particularly limited as long as it is a lithium-containing metal oxide, and examples thereof include lithium cobalt oxide and ternary composite metal oxide.

Among these, ternary composite metal oxides which are expressed by the following Expression (1) are preferable since a high cell capacity can be expected with good availability and low cost.

$$LiNi_xMn_yCo_zO_2 \qquad (1)$$

In Expression (1), Li represents lithium, Ni represents nickel, Mn represents manganese, Co represents cobalt, and O represents oxygen. x, y, and z represent atom ratios of the respective elements, and $0<x<1$, $0<y<1$, $0<z<1$, and $x+y+z=1$ are satisfied.

Among the ternary composite metal oxides expressed by Expression (1), particularly, $LiNi_{1/3}Mn_{1/3}Co_{1/3}O_2$ is a representative compound ($x=\frac{1}{3}$, $y=\frac{1}{3}$, $z=\frac{1}{3}$).

Generally, a positive electrode active material formed from a lithium metal oxide is dispersed in a powdery state in a binding agent, to be described later.

The average particle diameter of the lithium metal oxide is preferably 5 to 20 μm. When the average particle diameter of the lithium metal oxide is 5 pill or greater, the dispersion process is easily performed when manufacturing the positive electrode material. Therefore, the positive electrode active material and the materials such as after-mentioned conductive carbon and barium titanate can be uniformly dispersed and stable performance can thus be obtained. When the average particle diameter of the lithium metal oxide is 20 μm or less, sufficient reaction sites can be secured. Therefore, when it is used in a secondary cell, the cell can be charged or discharged with a high degree of efficiency.

The content of the positive electrode active material (lithium metal oxide) in the positive electrode material is preferably 2000 to 4000 parts by mass, and more preferably 2600 to 3500 parts by mass with respect to 100 parts by mass of the binding agent. When the content of the positive electrode active material is 2000 parts by mass or greater, a sufficient cell capacity can be secured for functioning as a secondary cell. When the content of the positive electrode active material is greater than 4000 parts by mass, a film formed from it is brittle. Therefore, there is a tendency that the adhesion between the positive electrode material and the collector, which will be described later, is easily lowered.

A commercialized product may be used as the lithium metal oxide, and a material manufactured using a known method such as a coprecipitation method may also be used.
<Conductive Carbon>

Conductive carbon serves as a conductive assistant.

The conductive carbon is not particularly limited as long as it is carbon having a conductive property. However, conductive carbon having a small number of active functional groups on a surface is preferable. When there are active functional groups on a surface of conductive carbon, the functional groups are decomposed in an alternating succession of charging and discharging, and oxygen, carbon dioxide, and the like are thus generated. Therefore, blisters and the like may be caused in the lithium ion secondary cell.

Acetylene black or the like is preferable as conductive carbon having a small number of active functional groups on a surface.

Generally, the conductive carbon is dispersed in a powdery state in a binding agent.

The average primary particle diameter of the conductive carbon is preferably 10 to 50 nm. When the average primary particle diameter of the conductive carbon is within the above range, the conductive property and dispersibility are improved.

Preferably, the conductive carbon forms a structure in which 10 to 20 primary particles are aggregated, and is then dispersed in a binding agent. The specific surface area of the structure is preferably 100 to 300 m$^2$/g. When the specific surface area is 100 m$^2$/g or greater, favorable electron conductivity is obtained.

When the specific surface area is 300 m$^2$/g or less, the dispersion process is easily performed when manufacturing the positive electrode material, and thus the positive electrode active material, the conductive carbon, barium titanate to be described later, and the like can be uniformly dispersed, and thus stable performance can be obtained.

The content of the conductive carbon in the positive electrode material is preferably 40 to 120 parts by mass, and more preferably 60 to 100 parts by mass with respect to 100 parts by mass of the binding agent. When the content of the conductive carbon is 40 parts by mass or greater, sufficient electron conductivity is obtained. When the content of the conductive carbon is 120 parts by mass or less, an ion conductive property of lithium ions leaving and entering the positive electrode active material can be favorably obtained.
<Barium Titanate>

Barium titanate has a high permittivity. Accordingly, the ionic conductance in the positive electrode material increases by dispersing the barium titanate in a binding agent.

The lithium ion secondary cell is a cell in which lithium ions separated from a lithium metal oxide (positive electrode active material) are released from a positive electrode and moved to a negative electrode during charging, but during discharging, lithium ions are moved from the negative electrode to the positive electrode to repeatedly perform charging and discharging. The lithium ions conduct electrical conduction.

When the ion conductance in the positive electrode material increases due to the effect of the barium titanate, lithium ions move smoothly in a mixture layer formed from the positive electrode material. As a result, for example, lithium ions are easily released from the positive electrode during charging, and thus a larger amount of lithium ions easily move to the negative electrode. Accordingly, charging and discharging accompanied by the movement of lithium ions are efficiently performed, and thus the cell capacity of the lithium ion secondary cell is increased.

Generally, the barium titanate is dispersed in a powdery state in a binding agent.

The average particle diameter of the barium titanate is preferably 300 nm or less. In the case in which the average particle diameter of the barium titanate is greater than 300 nm, when a mixture layer is formed, irregularities on a surface of the mixture layer increase in size. As a result, as will be described later in detail, there is a concern that a separator which is present between the positive electrode and the negative electrode may be broken.

The content of the barium titanate in the positive electrode material is preferably 3.3 to 66.7 parts by mass, and more preferably 15 to 66.7 parts by mass with respect to 100 parts by mass of the binding agent. When the content of the barium titanate is 3.3 parts by mass or greater, lithium ions can move more smoothly in a mixture layer formed from the positive electrode material during charging and discharging. When the content of the barium titanate is 66.7 parts by mass or less, the movement of electrons of the conductive carbon is not disturbed in a mixture layer formed from the positive electrode material during charging and discharging.

<Binding Agent>

The binding agent serves to support the positive electrode active material formed from a lithium metal oxide, the conductive carbon, and the barium titanate by a collector, to be described later.

As the binding agent, polyvinylidene fluoride (PVDF) is generally used since it has high ion conductance and is easily fibrillated. When the binding agent is easily fibrillated, an electrolytic solution, to be described later, easily penetrates thereinto when producing a lithium ion secondary cell. As a result, lithium ions easily move from the positive electrode to the negative electrode, or from the negative electrode to the positive electrode, and thus the cell capacity is further increased.

Although PVDF is easily fibrillated, a film formed from it is brittle and easily cracked. In addition, as will be described later, a positive electrode material using only PVDF as a binding agent is also poor in adhesion to the collector. Accordingly, a mixture of polytetrafluoroethylene (PTFE) having ion conductivity and flexibility and PVDF, or a copolymer of vinylidene fluoride (VDF) and tetrafluoroethylene (TFE) is preferably used as a binding agent. The copolymer may be used in combination with PVDF.

However, when PTFE is used as a binding material, there is also a tendency that the adhesion of the positive electrode material with respect to the collector (particularly, aluminum) is easily lowered when repeatedly performing charging and discharging, and thus the cell performance is lowered.

Therefore, a mixture of PVDF and PTFE, a copolymer of VDF and TFE, or the like is preferably used in combination with an acrylic copolymer. When an acrylic copolymer is used, the adhesion of the positive electrode material with respect to the collector (particularly, aluminum) is improved, and the adhesion between the collector and the positive electrode material can be maintained even when charging and discharging are repeatedly performed. Thus, a reduction in the cell performance can be suppressed.

The glass transition temperature (Tg) of the acrylic copolymer is preferably 60° C. or lower. When Tg is higher than 60° C., flexibility is insufficient, and thus peeling may occur from the collector during the course of repeatedly performing charging and discharging, or the mixture layer may be cracked when the positive electrode is bent.

Tg of the acrylic copolymer can be adjusted according to the kind and blending amount of each of monomers constituting the acrylic copolymer. In addition, Tg of the acrylic copolymer is a value which is obtained from the Fox equation which is expressed by the following equation (i).

$$1/(Tg+273.15)=\Sigma[W_n/(Tg_n+273.15)] \quad (i)$$

In equation (i), Tg represents a glass transition temperature (° C.) of the acrylic copolymer, $W_n$ represents mass % of a monomer n constituting the acrylic copolymer, and $Tg_n$ represents a glass transition temperature (° C.) of a homopolymer of the monomer n.

$Tg_n$ is widely known as a characteristic value of the homopolymer. For example, a value described in "POLYMER HANDBOOK, THIRD EDITION" may be used.

In addition, the acid value of the acrylic copolymer is preferably 20 to 80 mgKOH/g. When the acid value is 20 mgKOH/g or greater, the adhesion between the positive electrode material and the collector (particularly, aluminum) is improved. Furthermore, the dispersibility of lithium metal oxide, conductive carbon, and barium titanate is also improved. However, when the acid value is increased, there is a tendency that the acrylic copolymer is easily influenced by moisture. Accordingly, the upper limit value of the acid value is preferably 80 mgKOH/g or less.

Here, the acid value of the acrylic copolymer means the mg of potassium hydroxide required for neutralizing the acid contained in 1 g of the acrylic copolymer.

The acrylic copolymer is obtained by, for example, copolymerizing a (meth)acrylic ester. Examples of the (meth) acrylic ester include alkyls or cycloalkyl esters of (meth) acrylic acids such as methyl (meth)acrylate, ethyl (meth) acrylate, n-butyl (meth)acrylate, iso-butyl (meth)acrylate, tert-butyl (meth)acrylate, 2-ethylhexyl (meth)acrylate, cyclohexyl (meth)acrylate, and isobornyl (meth)acrylate.

The acrylic copolymer may be prepared by copolymerizing a (meth)acrylic ester with another monomer which can be copolymerized with the (meth)acrylic ester.

Examples of another monomer include α,β-ethylenic unsaturated carboxylic acids such as (meth)acrylic acid, maleic acid, fumaric acid, and itaconic acid.

In the invention, "(meth)acrylate" represents both methacrylate and acrylate. In addition, "(meth)acrylic acid" represents both a methacrylic acid and an acrylic acid.

When an acrylic copolymer, PVDF, and a copolymer of VDF and TFE are used in combination as a binding agent, the ratio of the acrylic copolymer is preferably 23.3 to 60.0 mass %, the ratio of the PVDF is preferably 16.7 to 66.7 mass %, and the ratio of the copolymer of VDF and TFE is preferably 8.3 to 33.3 mass % when the sum of the three components is 100 mass %.

When the ratio of the acrylic copolymer is 23.3 mass % or greater, the adhesion between the positive electrode material and the collector is further improved, and a favorable cell capacity can be maintained. When the ratio of the acrylic copolymer is 60.0 mass % or less, the binding agent is easily fibrillated, and thus the electrolytic solution easily penetrates thereinto and the cell capacity is further increased.

When the ratio of the PVDF is 16.7 mass % or greater, the binding agent is easily fibrillated, and thus the electrolytic solution easily penetrates thereinto and the cell capacity is further increased. When the ratio of the PVDF is 66.7 mass % or less, the adhesion between the positive electrode material and the collector is further improved and the flexibility of the positive electrode material is increased. Thus, cracks are rarely caused even when the positive electrode is deformed.

When the ratio of the copolymer of VDF and TFE is 8.3 mass % or greater, the flexibility of the positive electrode material is increased, and thus cracks are rarely caused even when the positive electrode is deformed. When the ratio of the copolymer of VDF and TFE is 33.3 mass % or less, the adhesion between the positive electrode material and the collector is further improved and a favorable cell capacity can be maintained.

<Other Components>

If necessary, the positive electrode material of the invention may contain other components other than a lithium metal oxide, conductive carbon, barium titanate, and a binding agent within the range not impairing the effects of the invention.

Examples of other components include normal additives which are used in a positive electrode of a lithium ion secondary cell. Specific examples thereof include a viscosity adjusting agent, a dispersing agent, a surface adjusting agent, a surface regulator, and an antifoaming agent.

<Method of Manufacturing Positive Electrode Material>

The positive electrode material of the invention is obtained by mixing a lithium metal oxide, conductive carbon, barium titanate, and a binding agent.

<Working Effects>

Regarding the above-described positive electrode material of the invention, the ionic conductance in the positive electrode material increases due to the barium titanate dispersed in the binding agent. Accordingly, lithium ions smoothly move in a mixture layer formed from the positive electrode material during charging and discharging. As a result, for example, lithium ions are easily released from the positive electrode during charging, and thus a larger amount of lithium ions easily move to the negative electrode. Accordingly, charging and discharging accompanied by the movement of lithium ions are efficiently performed, and thus the cell capacity of the lithium ion secondary cell is increased.

Particularly, as the binding agent, when an acrylic copolymer is used in combination with a homopolymer or a copolymer of VDF, the adhesion between the positive electrode material and the collector can be favorably maintained even when charging and discharging are repeatedly performed. Thus, a reduction in the cell performance can be suppressed.

In addition, the positive electrode material of the invention can be easily manufactured by mixing a lithium metal oxide, conductive carbon, barium titanate, and a binding agent as described above. Accordingly, it is easier compared with the method in which a lithium metal oxide is coated with barium titanate and then heat-treated as described in PATENT DOCUMENT 1, and no great care is required.

[Lithium Ion Secondary Cell]

Examples of the lithium ion secondary cell include a lamination type in which a laminate in which a positive electrode and a negative electrode are disposed with a separator interposed therebetween is impregnated with a nonaqueous electrolytic solution, and a winding type in which a wound body formed by winding the laminate into a roll shape is impregnated with a nonaqueous electrolytic solution.

<Positive Electrode>

The lithium ion secondary cell of the invention has a positive electrode provided with a collector and a mixture layer (positive electrode mixture layer) which is formed on the collector using the positive electrode material of the invention.

The material of the collector may be a conductive material, and representative examples thereof include aluminum.

The shape of the collector is not particularly limited. However, a thin film shape is preferable and a thickness thereof is preferably 5 to 100 μm.

The thickness of the positive electrode mixture layer is preferably 10 to 300 μm.

For example, a positive electrode mixture slurry is prepared by dispersing the positive electrode material of the invention in a solvent, and then applied to a collector and dried to form a positive electrode mixture layer. Whereby, the positive electrode is obtained.

If necessary, the positive electrode mixture layer may be pressed after drying.

Examples of the solvent which is used in the positive electrode mixture slurry include N-methyl-2-pyrrolidone, dimethylacetamide, and dimethylformamide. Among these, N-methyl-2-pyrrolidone is preferable from the viewpoint of handleability and the environment.

The method of applying the positive electrode mixture slurry to the collector is not particularly limited, and examples thereof include a doctor blade method, a spray method, a brush coating method, a roller coating method, a curtain coating method, a flow coating method, and a dip coating method.

In addition, the method of drying the positive electrode mixture slurry applied to the collector is not particularly limited as long as the solvent in the slurry can be removed.

<Negative Electrode>

The negative electrode is an electrode provided with a collector and a mixture layer (negative electrode mixture layer) which is formed on the collector using a negative electrode material.

The material of the collector may be a conductive material, and examples thereof include copper, gold, and silver.

The shape of the collector is not particularly limited. However, a thin film is preferable and a thickness thereof is preferably 5 to 100 μm.

The negative electrode material which forms the negative electrode mixture layer has an active material (negative electrode active material) and a binding agent.

Examples of the negative electrode active material include graphite, carbon black, activated carbon, low crystallinity carbon powder, carbon fiber, carbon nanotube, fullerene, coke, soft carbon, and hard carbon.

PVDF or PTFE having a high ionic conductance is used as the binding agent. In addition, the PVDF and PTFE are preferably used in combination with an acrylic copolymer to increase the adhesion of the negative electrode material with respect to the collector (particularly, copper). Examples of the acrylic copolymer include the acrylic copolymer described in the explanation of the positive electrode material.

The thickness of the negative electrode mixture layer is preferably 10 to 300 μm.

For example, a negative electrode mixture slurry is prepared by dispersing a negative electrode material in a solvent, and then applied to a collector and dried to form a negative electrode mixture layer. Whereby, the negative electrode is obtained. If necessary, the negative electrode mixture layer may be pressed after drying.

Examples of the solvent which is used in the negative electrode mixture slurry include N-methyl-2-pyrrolidone, dimethylacetamide, and dimethylformamide. Among these, N-methyl-2-pyrrolidone is preferable from the viewpoint of handleability and the environment.

The method of applying the negative electrode mixture slurry to the collector is not particularly limited, and examples thereof include a doctor blade method, a spray method, a brush coating method, a roller coating method, a curtain coating method, a flow coating method, and a dip coating method.

In addition, the method of drying the negative electrode mixture slurry applied to the collector is not particularly limited as long as the solvent in the slurry can be removed.

<Electrolytic Solution>

A solution in which an electrolyte is dissolved in a nonaqueous organic solvent is used as the electrolytic solution.

Examples of the nonaqueous organic solvent include chain carbonates such as dimethyl carbonate, diethyl carbonate, and ethyl methyl carbonate, and cyclic carbonates such as ethylene carbonate and propylene carbonate. In the movement of lithium ions between the positive electrode and the negative electrode, it is advantageous that the nonaqueous organic solvent has a high permittivity. Accordingly, a mixture of a cyclic carbonate having a high permittivity and a chain carbonate having an effect of reducing viscosity is preferably used.

Examples of the electrolyte include lithium salt such as lithium hexafluorophosphate.

<Method of Manufacturing Lithium Ion Secondary Cell>

A laminate is obtained by laminating the above-described positive electrode and negative electrode with a separator interposed therebetween and is then impregnated with an electrolytic solution to obtain a lamination type lithium ion secondary cell.

A wound body is obtained by winding the laminate into a roll (spiral), and is then impregnated with an electrolytic solution to obtain a winding type lithium ion secondary cell.

As the separator, a normal separator which is used in a lithium ion secondary cell can be used.

<Working Effects>

Since the above-described lithium ion secondary cell of the invention has a positive electrode provided with a mixture layer formed from the positive electrode material of the invention, lithium ions smoothly move in the mixture layer during charging and discharging. As a result, for example, lithium ions are easily released from the positive electrode during charging, and thus a larger amount of lithium ions easily move to the negative electrode. Accordingly, charging and discharging accompanied by the movement of lithium ions are efficiently performed, and thus the lithium ion secondary cell of the invention has a high cell capacity per volume.

EXAMPLES

Hereinafter, the invention will be described in detail with examples, but is not limited thereto.

Materials used in the examples and comparative examples will be shown as follows.

[Materials]

<Binding Agent>

As a binding agent, polyvinylidene fluoride ("Kureha KF Polymer L#9130" manufactured by Kureha Corporation, hereinafter, referred to as "PVDF"), a copolymer of vinylidene fluoride and tetrafluoroethylene ("Neoflon VT470" manufactured by Daikin Industries, Ltd.), hereinafter, referred to as "P(TFE-VDF)"), and acrylic copolymers 1 to 3 prepared as follows were used.

(Preparation of Acrylic Copolymers 1 to 3)

A total of 300 parts by mass of a monomer mixture having a mass ratio shown in Table 1, 300 parts by mass of ethyl acetate, and 0.3 parts by mass of benzoyl peroxide were charged into a 2 L reaction container provided with a stirrer, a capacitor, and a thermometer, and the air in the reaction container was replaced by nitrogen gas. Then, the temperature of the reaction solution in the reaction container was increased to 75° C. under stirring in the nitrogen atmosphere to cause a polymerization reaction under conditions of 75° C.×12 hours, whereby the acrylic copolymers 1 to 3 were obtained.

The glass transition temperature (Tg) of the obtained acrylic copolymers 1 to 3 was obtained from the Fox equation expressed by the above equation (i). A solution prepared by dissolving potassium hydroxide in methanol at a normality of 0.1 was titrated to measure the acid values of the acrylic copolymers 1 to 3.

The results thereof are shown in Table 1.

TABLE 1

| Acrylic Copolymer | | 1 | 2 | 3 |
| --- | --- | --- | --- | --- |
| Monomer | MMA | 20 | 20 | 46 |
| Mixture | n-BMA | 50 | 50 | 32 |
| (mass %) | BA | 22 | 27 | 10 |
| | MAA | 8 | 3 | 12 |
| Glass Transition Temperature [° C.] | | 21 | 10 | 60 |
| Acid Value [mgKOH/g] | | 50 | 20 | 80 |

The amounts of the monomers in Table 1 are amounts (mass %) when a total of these monomers is 100 mass %.

The abbreviations in Table 1 are as follows. Tg in the brackets of each monomer represents Tg of the homopolymer.

MMA: methyl methacrylate (Tg: 105° C.)
n-BMA: n-butyl methacrylate (Tg: 20° C.)
BA: n-butyl acrylate (Tg: −54° C.)
MAA: methacrylic acid (Tg: 228° C.)

<Negative Electrode>

A sheet for a negative electrode (a "negative electrode one-side type for a lithium cell" manufactured by Piotrek, 1.6 mAh/cm$^2$), in which graphite dispersed in a binding agent was applied to copper foil, commercially available for a lithium ion secondary cell was used as a negative electrode.

<Electrolytic Solution>

A nonaqueous electrolytic solution ("LBG-00022" manufactured by Kishida Chemical Co., Ltd.) in which lithium hexafluorophosphate (LiPF$_6$) was dissolved at 1 mol/L in a mixed solvent obtained by mixing ethylene carbonate (EC) and dimethyl carbonate (DMC) at a volume ratio of 1:1 was used as an electrolytic solution.

<Separator>

A microporous film made of polypropylene ("Cell Guard 2400" manufactured by Tonen Corporation) was used as a separator.

Example 1

Production of Positive Electrode

A binding agent was prepared with a composition shown in Table 2.

A ternary lithium composite metal oxide (average particle diameter: 10 μm) expressed by $LiNi_{1/3}Mn_{1/3}CO_{1/3}O_2$ as a positive electrode active material, acetylene black ("Denka Black FX-35" manufactured by Denki Kagaku Kogyo Kabushiki Kaisha, average primary particle diameter: 23 nm, specific surface area: 133 m²/cm) as a conductive assistant, and barium titanate (average particle diameter: 300 nm) were mixed and dispersed in blending amounts shown in Table 2 in 100 parts by mass of the previously prepared binding agent to prepare a positive electrode material.

N-methyl-2-pyrrolidone was added to the obtained positive electrode material so that the non-volatile content became 50 mass %, and kneading was further performed to prepare a positive electrode mixture slurry.

The obtained positive electrode mixture slurry was applied to a collector (aluminum foil having a thickness of 30 μm) with a doctor blade and was dried for 1 hour at 23° C. Thereafter, the resulting material was pressed for 10 minutes at 100° C. under a pressure of 4.9 MPa, whereby a positive electrode in which a positive electrode mixture layer having a thickness of approximately 40 μm was formed on the collector was obtained.

<Production of Lithium Ion Secondary Cell>

Using the positive electrode produced as above and the above-described negative electrode, electrolytic solution, and separator, a lithium ion secondary cell was produced using a commercially available three-electrode cell for evaluation (manufactured by Toyo System Co., Ltd.).

The following evaluation was performed on the obtained lithium ion secondary cell. The results are shown in Table 1.

<Evaluation>

(Measurement of Depth of Discharge)

First, a mass of the positive electrode material was measured to obtain a theoretical capacity (A) of the lithium ion secondary cell from the following equation (ii). The obtained theoretical capacity (A) is a value on the assumption that the entire amount of lithium contained in the positive electrode active material in the positive electrode material was reacted (became lithium ions).

$$\text{Theoretical Capacity } (A) \text{ [mAh/g]} = 278 \times \text{Ratio of Positive Electrode Active Material in Positive Electrode Material} \quad \text{(ii)}$$

Here, "278" is a theoretical capacity (mAh/g) on the assumption that the entire amount of lithium in $LiNi_{1/3}Mn_{1/3}Co_{1/3}O_2$ was reacted (became lithium ions).

With respect to the obtained theoretical capacity, constant-current charging was conducted until the cell voltage became 4.2 V at a current of 1 C. After a 10 minute break, constant-current discharging was conducted until the cell voltage became 2.5 V at a current of 1 C. Here, "a current of 1 C" means a current equivalent to the current capacity of a battery. For example, in the case of a battery of 100 Ah, a current of 1 C is 100 A, and a current of 0.1 C is 10 A.

A value obtained by dividing, by the mass of the positive electrode material used in the positive electrode, an average discharge current amount obtained by repeatedly performing the charging and discharging three times at intervals of 10 minutes was set as a discharge capacity (B), and a depth of discharge (C) was obtained from the following equation (iii). The depth of discharge is an index of the cell capacity per volume of the lithium ion secondary cell, and means that the higher the depth of discharge, the higher the cell capacity.

$$\text{Depth of Discharge } (C)[\%] = \text{Discharge Capacity } (B) / \text{Theoretical Capacity } (A) \times 100 \quad \text{(iii)}$$

(Charging and Discharging Test)

Charging and discharging were repeatedly performed 100 times every 10 minutes under the same conditions as in the measurement of the depth of discharge to perform a charging and discharging test. A value obtained by dividing, by the mass of the positive electrode material used in the positive electrode, an average discharge current amount in the 97th to 100th charging and discharging was set as a discharge capacity (D) after a charging and discharging test, and a depth of discharge (E) after a charging and discharging test was obtained from the following equation (iv).

$$\text{Depth of Discharge } (E)[\%] = \text{Discharge Capacity } (D) / \text{Theoretical Capacity } (A) \times 100 \quad \text{(iv)}$$

In addition, a capacity retention rate (F) after a charging and discharging test was obtained from the following equation (V).

$$\text{Capacity Retention Rate } (F)[\%] = \text{Discharge Capacity } (D) / \text{Discharge Capacity } (B) \times 100 \quad \text{(V)}$$

Examples 2 to 15 and Comparative Examples 1 to 6

A positive electrode material was prepared in the same manner as in Example 1, except that the composition of the binding agent and the blending amounts of the barium titanate, conductive carbon, and positive electrode active material were changed as shown in Tables 2 to 4, and using the obtained positive electrode material, a lithium ion secondary cell was produced and evaluated. The results are shown in Tables 2 to 4.

TABLE 2

| | | | Examples | | | | | | | |
|---|---|---|---|---|---|---|---|---|---|---|
| | | | 1 | 2 | 3 | 4 | 5 | 6 | 7 | 8 |
| Composition of Positive Electrode Material | Binding Agent [parts by mass] | Acrylic Copolymer 1 | 50.0 | 50.0 | 50.0 | 50.0 | 33.3 | 50.0 | 23.3 | 60.0 |
| | | Acrylic Copolymer 2 | 0 | 0 | 0 | 0 | 0 | 0 | 0 | 0 |
| | | Acrylic Copolymer 3 | 0 | 0 | 0 | 0 | 0 | 0 | 0 | 0 |
| | | P (TFE-VDF) | 33.3 | 33.3 | 33.3 | 33.3 | 58.4 | 16.7 | 66.7 | 23.3 |
| | | PVDF | 16.7 | 16.7 | 16.7 | 16.7 | 8.3 | 33.3 | 10.0 | 16.7 |
| | Conductive Assistant [parts by mass] | Acetylene Black | 83.3 | 83.3 | 83.3 | 83.3 | 83.3 | 83.3 | 83.3 | 83.3 |
| | Positive Electrode Active Material [parts by mass] | Ternary Lithium Composite Metal Oxide | 3333.3 | 3333.3 | 3333.3 | 3333.3 | 3333.3 | 3333.3 | 3333.3 | 3333.3 |
| | Barium Titanate [parts by mass] | | 1.0 | 3.3 | 16.7 | 66.7 | 16.7 | 16.7 | 16.7 | 16.7 |

TABLE 2-continued

|  |  | Examples | | | | | | | |
|---|---|---|---|---|---|---|---|---|---|
|  |  | 1 | 2 | 3 | 4 | 5 | 6 | 7 | 8 |
| Ratio of Positive Electrode Active Material in Positive Electrode Material [%] | | 94.8 | 94.7 | 94.3 | 93.0 | 94.3 | 94.3 | 94.3 | 94.3 |
| Mass of Positive Electrode Material Used in Positive Electrode [g] | | 7.1 | 6.9 | 7.1 | 7.1 | 7.0 | 7.1 | 7.1 | 7.0 |
| Before Charging and Discharging Test | Theoretical Capacity (A) [mAh/g] | 263.4 | 263.3 | 262.3 | 258.6 | 262.3 | 262.3 | 262.3 | 262.3 |
| | Discharge Capacity (B) [mAh/g] | 238.9 | 245.1 | 251.2 | 247.0 | 248.1 | 244.4 | 249.4 | 247.8 |
| | Depth of Discharge (C) [%] | 90.7 | 93.1 | 95.8 | 95.5 | 94.6 | 93.2 | 95.1 | 94.5 |
| After Charging and Discharging Test | Discharge Capacity (D) [mAh/g] | 222.1 | 232.7 | 236.3 | 234.6 | 228.2 | 221.9 | 209.5 | 232.9 |
| | Depth of Discharge (E) [%] | 84.3 | 88.4 | 90.1 | 90.7 | 87.0 | 84.6 | 79.9 | 88.8 |
| Capacity Retention Rate (F) After Charging and Discharging Test [%] | | 93.0 | 94.9 | 94.1 | 95.0 | 92.0 | 90.8 | 84.0 | 94.0 |

TABLE 3

|  |  |  | Examples | | | | | | |
|---|---|---|---|---|---|---|---|---|---|
|  |  |  | 9 | 10 | 11 | 12 | 13 | 14 | 15 |
| Composition of Positive Electrode Material | Binding Agent [parts by mass] | Acrylic Copolymer 1 | 100.0 | 0 | 0 | 0 | 0 | 0 | 0 |
| | | Acrylic Copolymer 2 | 0 | 0 | 0 | 50.0 | 50.0 | 0 | 0 |
| | | Acrylic Copolymer 3 | 0 | 0 | 0 | 0 | 0 | 50.0 | 50.0 |
| | | P (TFE-VDF) | 0 | 100.0 | 0 | 33.3 | 33.3 | 33.3 | 33.3 |
| | | PVDF | 0 | 0 | 100.0 | 16.7 | 16.7 | 16.7 | 16.7 |
| | Conductive Assistant [parts by mass] | Acetylene Black | 83.3 | 83.3 | 83.3 | 60.0 | 100.0 | 83.3 | 83.3 |
| | Positive Electrode Active Material [parts by mass] | Ternary Lithium Composite Metal Oxide | 3333.3 | 3333.3 | 3333.3 | 3333.3 | 3333.3 | 2600.0 | 3500.0 |
| | | Barium Titanate [parts by mass] | 16.7 | 16.7 | 16.7 | 16.7 | 16.7 | 16.7 | 16.7 |
| Ratio of Positive Electrode Active Material in Positive Electrode Material [%] | | | 94.3 | 94.3 | 94.3 | 95.0 | 93.9 | 92.9 | 94.6 |
| Mass of Positive Electrode Material Used in Positive Electrode [g] | | | 7.1 | 7.0 | 7.0 | 7.0 | 6.9 | 7.0 | 7.0 |
| Before Charging and Discharging Test | Theoretical Capacity (A) [mAh/g] | | 262.3 | 262.3 | 262.3 | 264.0 | 261.0 | 258.1 | 263.0 |
| | Discharge Capacity (B) [mAh/g] | | 211.1 | 217.4 | 224.8 | 243.4 | 235.4 | 244.7 | 247.7 |
| | Depth of Discharge (C) [%] | | 80.5 | 82.9 | 85.7 | 92.2 | 90.2 | 94.8 | 94.2 |
| After Charging and Discharging Test | Discharge Capacity (D) [mAh/g] | | 187.0 | 178.3 | 168.6 | 226.3 | 223.7 | 230.0 | 232.7 |
| | Depth of Discharge (E) [%] | | 71.3 | 68.0 | 64.3 | 85.7 | 85.7 | 89.1 | 88.5 |
| Capacity Retention Rate (F) After Charging and Discharging Test [%] | | | 88.6 | 82.0 | 75.0 | 93.0 | 95.0 | 94.0 | 93.9 |

TABLE 4

|  |  |  | Comparative Examples | | | | | |
|---|---|---|---|---|---|---|---|---|
|  |  |  | 1 | 2 | 3 | 4 | 5 | 6 |
| Composition of Positive Electrode Material | Binding Agent [parts by mass] | Acrylic Copolymer 1 | 50.0 | 0 | 0 | 100.0 | 0 | 0 |
| | | Acrylic Copolymer 2 | 0 | 0 | 0 | 0 | 0 | 0 |
| | | Acrylic Copolymer 3 | 0 | 50.0 | 50.0 | 0 | 0 | 0 |
| | | P (TFE-VDF) | 33.3 | 33.3 | 33.3 | 0 | 100.0 | 0 |
| | | PVDF | 16.7 | 16.7 | 16.7 | 0 | 0 | 100.0 |
| | Conductive Assistant | Acetylene Black | 83.3 | 83.3 | 83.3 | 83.3 | 83.3 | 83.3 |

TABLE 4-continued

| | | Comparative Examples | | | | | |
|---|---|---|---|---|---|---|---|
| | | 1 | 2 | 3 | 4 | 5 | 6 |
| | [parts by mass] Positive Electrode Active Material | Ternary Lithium Composite Metal Oxide | 3333.3 | 2600.0 | 3500.0 | 3333.3 | 3333.3 | 3333.3 |
| | [parts by mass] Barium Titanate [parts by mass] | | 0 | 0 | 0 | 0 | 0 | 0 |
| Ratio of Positive Electrode Active Material in Positive Electrode Material [%] | | 94.8 | 93.4 | 95.0 | 94.8 | 94.8 | 94.8 |
| Mass of Positive Electrode Material Used in Positive Electrode [g] | | 7.1 | 7.0 | 7.0 | 7.1 | 6.9 | 7.0 |
| Before Charging and Discharging Test | Theoretical Capacity (A) [mAh/g] | 263.5 | 259.7 | 264.2 | 263.5 | 263.5 | 263.5 |
| | Discharge Capacity (B) [mAh/g] | 230.0 | 224.4 | 226.1 | 190.9 | 196.6 | 203.2 |
| | Depth of Discharge (C) [%] | 87.3 | 86.4 | 85.6 | 72.4 | 74.6 | 77.1 |
| After Charging and Discharging Test | Discharge Capacity (D) [mAh/g] | 216.3 | 210.1 | 210.3 | 166.5 | 157.3 | 150.5 |
| | Depth of Discharge (E) [%] | 82.1 | 80.9 | 79.6 | 63.2 | 59.7 | 57.1 |
| Capacity Retention Rate (F) After Charging and Discharging Test [%] | | 94.0 | 93.6 | 93.0 | 87.2 | 80.0 | 74.1 |

As obvious from Tables 2 and 3, the lithium ion secondary cells produced using the positive electrode materials obtained in the respective examples had a high cell capacity. In addition, it was possible to maintain the high cell capacity even when charging and discharging were repeatedly performed.

Particularly, Examples 1 to 9 and 12 to 15 using the acrylic copolymer as a binding agent were high in the depth of discharge (E) after a charging and discharging test and in the capacity retention rate (F) after a charging and discharging test. Among these, Examples 1 to 8 and 12 to 15 using the acrylic copolymer, P(TFE-VDF), and PVDF were high in the depth of discharge (E) after a charging and discharging test and in the capacity retention rate (F) after a charging and discharging test, and thus it was possible to maintain the high cell capacity even when charging and discharging were repeatedly performed.

As obvious from Table 4, the lithium ion secondary cell produced using the positive electrode material obtained in Comparative Example 1 was low in the depth of discharge (C) and the depth of discharge (E) after a charging and discharging test as compared with Examples 1 to 4, and the cell capacity was low.

The lithium ion secondary cell produced using the positive electrode material obtained in Comparative Example 2 was low in the depth of discharge (C) and the depth of discharge (E) after a charging and discharging test as compared with Example 14, and the cell capacity was low.

The lithium ion secondary cell produced using the positive electrode material obtained in Comparative Example 3 was low in the depth of discharge (C) and the depth of discharge (E) after a charging and discharging test as compared with Example 15, and the cell capacity was low.

The lithium ion secondary cell produced using the positive electrode material obtained in Comparative Example 4 was low in the depth of discharge (C) and the depth of discharge (E) after a charging and discharging test as compared with Example 9, and the cell capacity was low.

The lithium ion secondary cell produced using the positive electrode material obtained in Comparative Example 5 was low in the depth of discharge (C) and the depth of discharge (E) after a charging and discharging test as compared with Example 10, and the cell capacity was low.

The lithium ion secondary cell produced using the positive electrode material obtained in Comparative Example 6 was low in the depth of discharge (C) and the depth of discharge (E) after a charging and discharging test as compared with Example 11, and the cell capacity was low.

It was not possible to obtain a lithium ion secondary cell having a high cell capacity per volume with the positive electrode materials obtained in Comparative Examples 1 to 6 in which the barium titanate was not dispersed in the binding agent together with the positive electrode active material and the conductive carbon.

The invention claimed is:

1. A positive electrode material for a lithium ion secondary cell, comprising:
   a binding agent in which an active material formed from a lithium metal oxide is dispersed together with barium titanate and conductive carbon, the binding agent including an acrylic copolymer, polyvinylidene fluoride, and a copolymer of vinylidene fluoride and tetrafluoroethylene, wherein
   when a sum of the acrylic copolymer, the polyvinylidene fluoride, and the copolymer of the vinylidene fluoride and the tetrafluoroethylene is 100 mass %, a ratio of the acrylic copolymer is 23.3 to 60.0 mass %, and
   an acid value of the acrylic copolymer is 20 to 80 mgKOH/g.

2. The positive electrode material for a lithium ion secondary cell according to claim 1,
   wherein the lithium metal oxide is a composite metal oxide expressed by the following Expression (1):

$$LiNi_xMn_yCo_zO_2 \qquad (1)$$

(in Expression (1), Li represents lithium, Ni represents nickel, Mn represents manganese, Co represents cobalt, O represents oxygen, and $0<x<1$, $0<y<1$, $0<z<1$, and $x+y+z=1$ are satisfied).

3. The positive electrode material for a lithium ion secondary cell according to claim 1, wherein the content of the barium titanate is 3.3 to 66.7 parts by mass with respect to 100 parts by mass of the binding agent.

4. A lithium ion secondary cell comprising:
   a positive electrode which is provided with a collector and a mixture layer formed on the collector using the positive electrode material for a lithium ion secondary cell according to claim 1.

5. The positive electrode material for a lithium ion secondary cell according to claim 2, wherein the content of the barium titanate is 3.3 to 66.7 parts by mass with respect to 100 parts by mass of the binding agent.

6. The positive electrode material for a lithium ion secondary cell according to claim 1, wherein the binding agent further comprises polytetrafluoroethylene.

7. The positive electrode material for a lithium ion secondary cell according to claim 1, wherein the glass transition temperature (Tg) of the acrylic copolymer is 60° C. or lower.

8. The positive electrode material for a lithium ion secondary cell according to claim 1, wherein the acrylic copolymer is obtained by copolymerizing a (meth)acrylic ester.

9. The positive electrode material for a lithium ion secondary cell according to claim 1, wherein an average primary particle diameter of the conductive carbon is 10 to 50 nm, the conductive carbon forms a structure in which 10 to 20 primary particles are aggregated, and a specific surface area of the structure is 100 to 300 m$^2$/g.

10. The positive electrode material for a lithium ion secondary cell according to claim 1, wherein when the sum of the acrylic copolymer, the polyvinylidene fluoride, and the copolymer of the vinylidene fluoride and the tetrafluoroethylene is 100 mass %, a ratio of the polyvinylidene fluoride is 16.7 to 66.7 mass %.

11. The positive electrode material for a lithium ion secondary cell according to claim 1, wherein when the sum of the acrylic copolymer, the polyvinylidene fluoride, and the copolymer of the vinylidene fluoride and the tetrafluoroethylene is 100 mass %, a ratio of the copolymer of the vinylidene fluoride and the tetrafluoroethylene is 8.3 to 33.3 mass %.

12. The positive electrode material for a lithium ion secondary cell according to claim 8, wherein the (meth)acrylic ester is one or more compounds selected from the group consisting of methyl (meth)acrylate, ethyl (meth)acrylate, n-butyl (meth)acrylate, iso-butyl (meth)acrylate, tert-butyl (meth)acrylate, 2-ethylhexyl (meth)acrylate, cyclohexyl (meth)acrylate, and isobornyl (meth)acrylate.

13. The positive electrode material for a lithium ion secondary cell according to claim 1, wherein the conductive carbon is an acetylene black.

\* \* \* \* \*